INVENTORS.
RALPH J. PERRINE &
FRANK ROBERT MATHEWS
BY Meyer, Tilberry & Body
ATTORNEYS

# United States Patent Office 3,447,745
Patented June 3, 1969

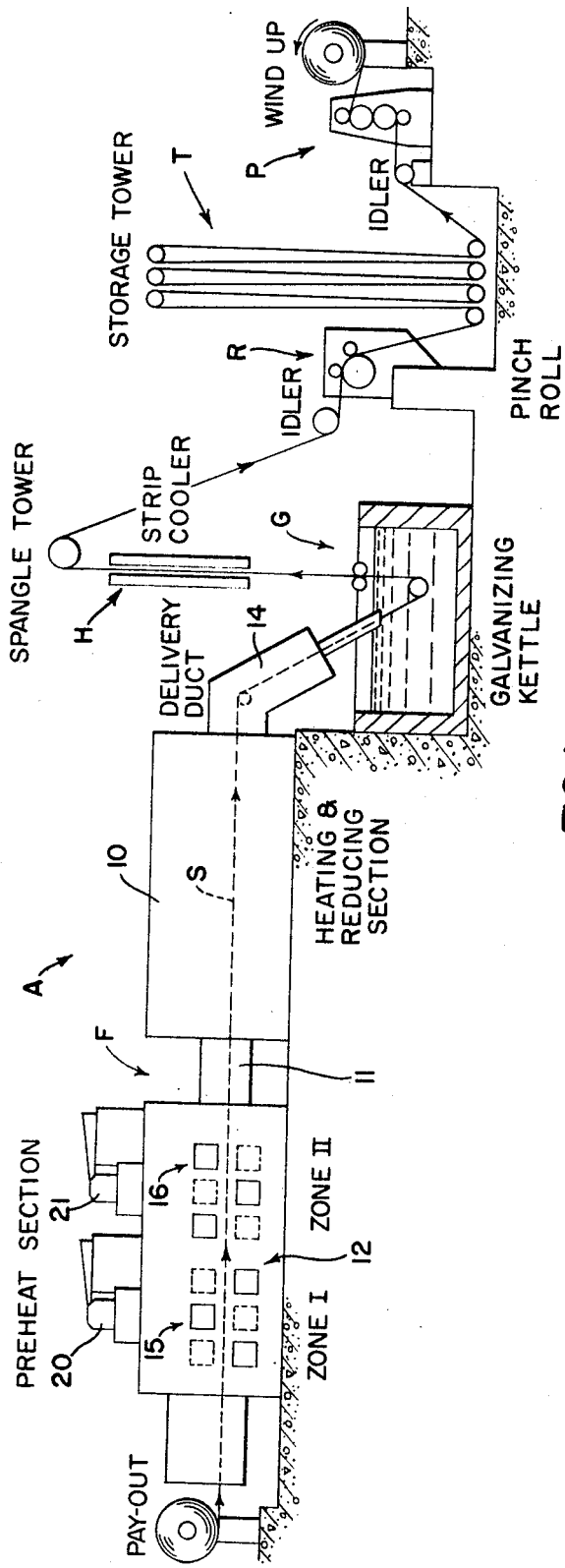

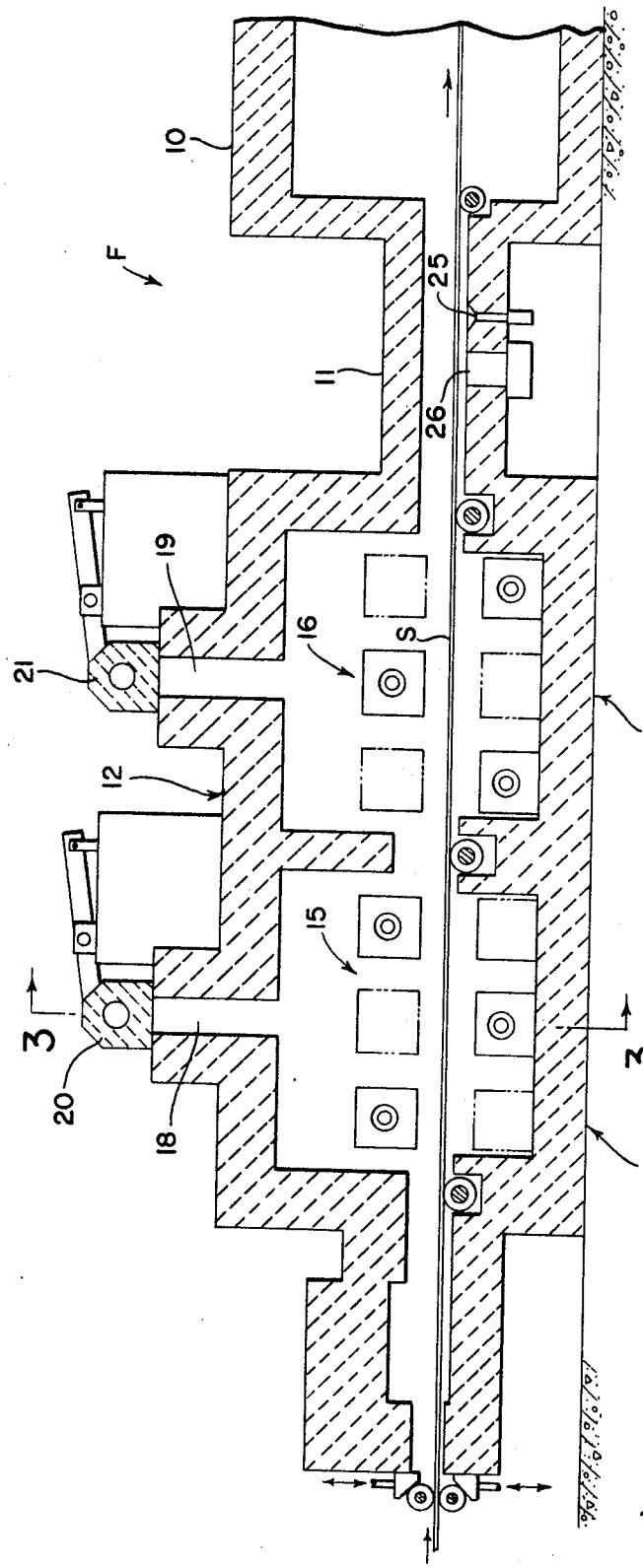

3,447,745
FURNACE HEATING CONTROL
Ralph J. Perrine, Columbiana, and Frank Robert Mathews, Salem, Ohio, assignors to The Electric Furnace Company, Salem, Ohio, a corporation of Ohio
Filed July 25, 1966, Ser. No. 567,627
Int. Cl. F23n *1/00;* F27b *9/20;* G05d *23/00*
U.S. Cl. 236—15                 8 Claims

ABSTRACT OF THE DISCLOSURE

The present disclosure pertains to a furnace control and method for the control of strip temperature over a wide range by automatically calling into operation a succession of heating zones each of which has a temperature controller preset to bring the zone into service in response to a master signal which varies independently of the respective zone temperatures in accordance with the deviation of strip temperature from a desired strip temperature.

---

The invention will be described with reference to a furnace for a continuous galvanizing line in which the strip speed may change depending on the type of heat treatment to be given the strip, strip thickness and possibly other factors, however, it will be appreciated that the invention is equally applicable to other situations where strip work is to be heated to a predetermined uniform temperature regardless of line speed or other variables which may affect the heating rate.

In the operation of a typical galvanizing line, strip work passes through a heat treating furnace which includes a preheating chamber. The strip then passes through a heating chamber in which the strip temperature is stabilized as required by the particular heat treatment being carried out. Upon leaving the furnace the strip is immersed in a galvanizing kettle containing molten zinc. Upon leaving the galvanizing kettle, the strip passes through final disposal equipment such as a strip cooler, a storage tower and finally shearing or recoiling machinery.

The heat treatment which the strip undergoes in the heating chamber will depend upon the ultimate use to be made of it. That is, for full-hard steel strip suitable for light drawing operations, the heating chamber will operate at a much lower temperature, say approximately 1000° F., while for normalized strip suitable for deep or intermediate drawing, a temperature of in the order of 1800° F. is required. Thus in normalizing, the heat required per pound of strip is relatively large as compared to a full-hard strip and requires the maximum heating capacity of the heating chamber for a given hourly production rate. If greater heating capacity were needed, say for thicker strip, either the heating chamber would have to be longer or the hourly production decreased to compensate. It has been proposed to arrange that the heating chamber be fired throughout its length by separately controlled burner groups arranged to go into or out of service depending on the required heating rate. In effect, the length and heat liberating capacity of the heating chamber is made variable so that the line may be geared at a higher speed.

Heretofore, such furnaces have been gas-fired and the heating controls have been made responsive to variations in burner manifold pressure. That is, when the manifold pressure of one group of burners reaches a predetermined value, the next group is turned on, and so on, until all the burners are on if necessary. Ordinarily the burner group nearest the exit end of the heating chamber will operate continuously while the other groups are brought successively into service as needed and are cut out in reverse order.

Such prior art heating controls are at best only indirectly responsive to strip temperature and are subject to artificial drops in manifold pressure unrelated to the fuel burning rate. Also, the actual temperature in the various zones of the heating chamber is not reflected by a heating control responsive only to manifold pressure. Moreover, if it is desirable to heat by means other than gas burners, such as by electric resistance elements, the prior art controls are wholly inappropriate for this purpose.

These and other difficulties are overcome with the present invention which provides a heating control for a plurality of heating zones which is directly responsive to the temperature in the respective zones such that only as many as necessary are brought into service in accordance with the heating requirements.

In accordance with the invention, a plurality of heating means are grouped into successive zones, each being responsive to a heating control on which a master signal is imposed on each zone throughout the total heating range. The master signal varies in accordance with the difference between measured strip temperature and a desired exit strip temperature. A zone control output signal for each zone is delivered by a temperature limit controller which measures zone ambient temperature and varies with the difference between such temperature and a predetermined zone set point. A comparator determines when the master signal exceeds the zone control output signal and increases the heating rate by causing an increase in the number of zones in operation in accordance with the production requirements.

In an embodiment of the invention, a pneumatically operated control includes a minimum pressure for each zone which is preset to correspond to the master signal at which the zone is to be brought into or out of service. A master control pressure signal, dependent upon the error of strip temperature relative to the setting of a master control is delivered to a computer controller which pneumatically measures it against the zone minimum pressure and if the former is larger, produces a computer output signal. The comparator selects the lower of the computer output and zone control output signals for controlling the zone heating rate whereby each zone remains idle below the zone minimum pressure and comes on in succession as the computer output signal exceeds the zone set point for the preceding zone.

In accordance with a further aspect of the invention, an all-electric control is provided in which the zone minimum temperatures are determined by a relay range setting for the respective zones and the heating elements are responsive to regulation from an external electrical power source.

A principal object of the invention is to provide a heating control for a plurality of heating zones responsive to temperature limiting controllers in each zone preset to cause each zone to come into and go out of service in a sequential fashion.

A further object is to provide a heating control of the type referred to which is able to control heating means other than gas fired burners, such as liquid fuel burners, resistance heaters or the like.

Still another object is to provide a sequential zone heating control suitable for electrical or pneumatic operation which is responsive to an increase in the difference between strip temperature and a control setting to increase the heating rate in accordance with production requirements.

These and other objects will become more apparent by referring to the following description and drawings wherein:

FIGURE 1 schematically represents a portion of a continuous strip galvanizing line including a heat treating furnace, galvanizing kettle, strip cooler and processing equipment incidental to the line;

FIGURE 2 is a representative sectional enlargement of the preheating section of the furnace depicted in FIGURE 1;

Figure 7:
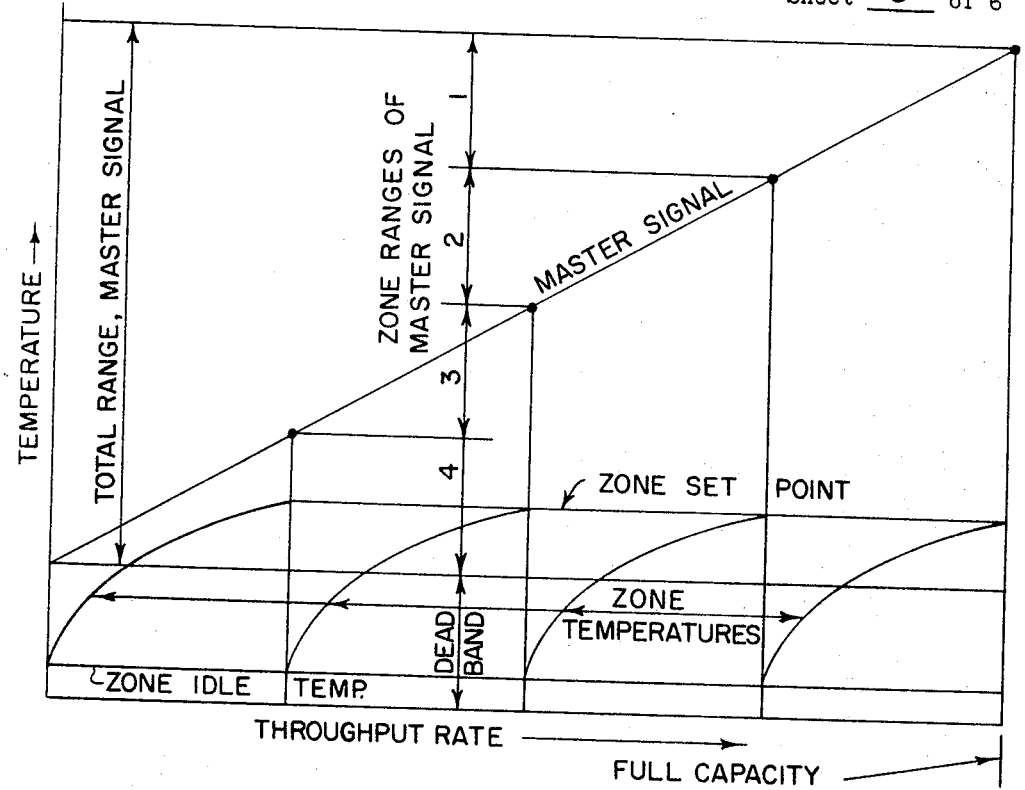
FIGURE 7 is a chart showing the operational characteristics of a four zone heating control of the type shown in either FIGURES 5 or 6.

Referring now to the drawings wherein the showings are for the purpose of illustrating a preferred embodiment of the invention only and not for the purpose of limiting same, FIGURE 1 is an exemplary of a continuous strip galvanizing line A including a furnace F, a galvanizing kettle G, a strip cooler H, rolls R, storage tower T and bridle stand P. Other apparatus may be provided including a storage tower and shearing and welding means at the entrance end, and shearing means at the exit end. The furnace F includes a heating chamber section 10 connected by a vestibule 11 to a preheating section 12 through which a strip S passes. The preheating section 12 carries out the first stage of heating the strip S, in the case of steel strip, from room temperature to about 700° F. to 900° F. for the principal purpose of burning off objectionable residues such as rolling mill lubricants and also in many cases for oxidizing the strip lightly. The preheating section 12 operates at a high chamber temperature, desirably up to about 2000° F. or more in order to heat the strip to the desired temperature as rapidly as possible. The strip enters the heating chamber section 10 at say 800° F. and subsequently receives a heat treatment designed to produce the physical properties desired. For example, where the strip is for deep drawing applications, it receives a normalizing treatment of about 1800° F. or for intermediate drawing applications, a lighter anneal of about 1400° F. and for a full-hard strip, heating is to about 1000° F. The heating chamber section 10 contains a reducing atmosphere such as dissociated ammonia or other hydrogen-nitrogen mixture. A delivery duct 14 protects the strip upon leaving the heating chamber 10 until it enters the galvanizing kettle G which contains molten metal usually zinc, which is to be coated upon the strip.

Figure 3:
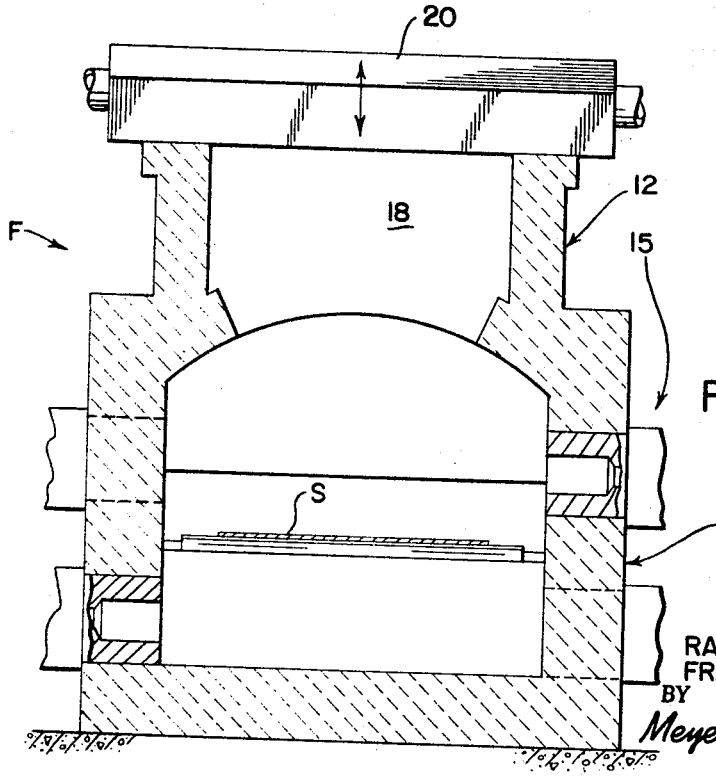
FIGURE 3 is a cross-sectional view of the preheating section shown in FIGURE 2 taken along line 3—3.

Referring now to FIGURES 2 and 3, the preheating section 12 is divided into two zones, I and II, each of which is serviced by a set of gas fired burners 15, 16. The combustion products of each zone I, II may be vented at openings 18, 19 respectively or these openings may be closed by dampers 20, 21 under certain conditions such as in the event of strip stoppage whereupon the burners 15, 16 are shut off and a protective atmosphere may be introduced into the preheating section 12 in accordance with the method and apparatus described in the copending U.S. application by F. Troy Cope and Ralph J. Perrine, Ser. No. 482,381 filed Aug. 25, 1965. An opening 25 for control thermocouple, or suitable opening 26 for a radiative temperature sensing device, or both, is provided through the bottom wall of the vestibule 11 to measure strip temperature for reasons described hereinafter.

Figure 4:
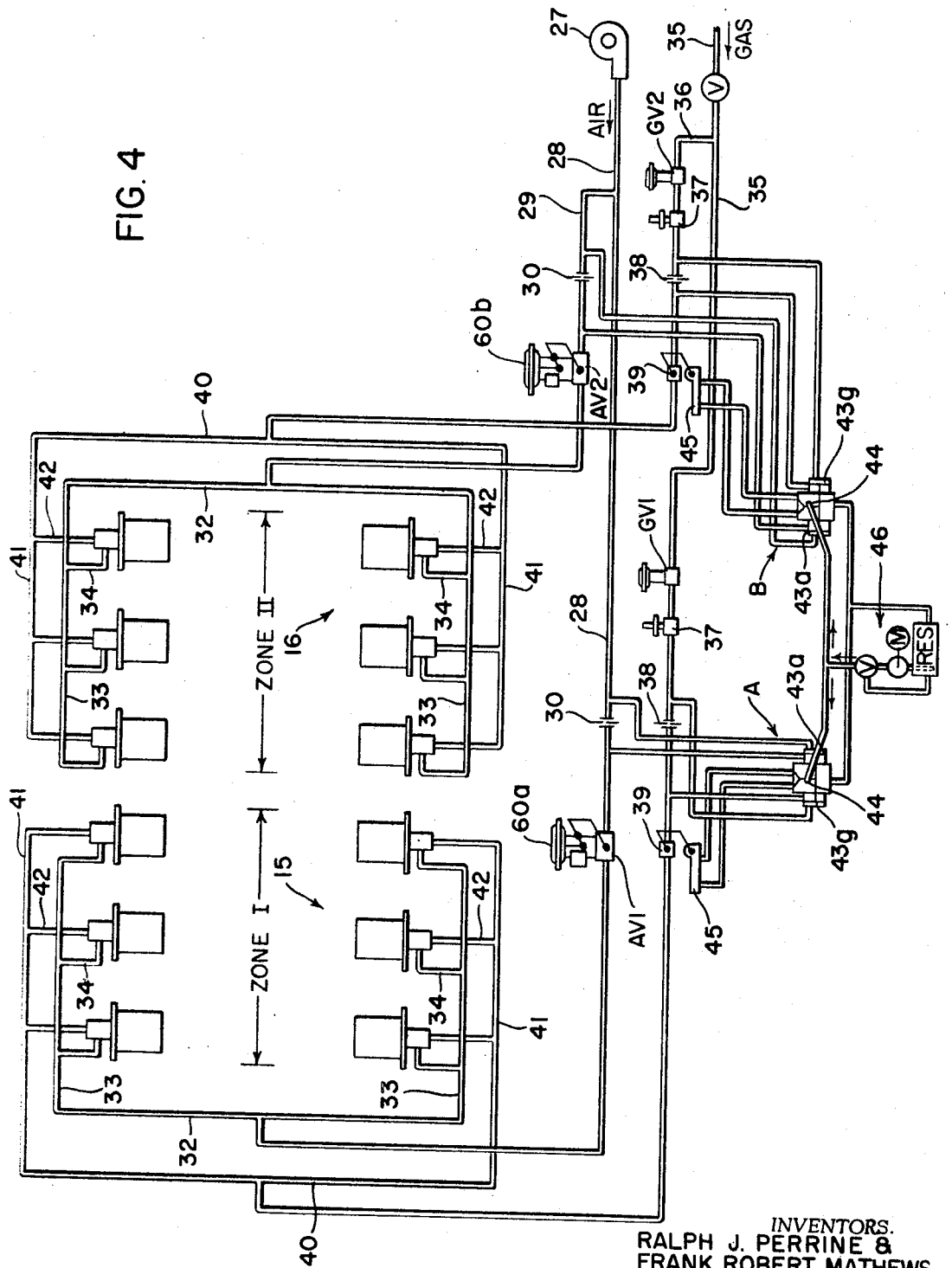
FIGURE 4 is a diagram of a gas fuel system for burners servicing the preheating section.

Referring now to FIGURE 4, a burner piping diagram is shown for the zones I and II of the preheating section 12. As shown 12 burners are divided into two groups, each servicing zones I and II respectively. The burners 15, 16 are each situated in the side walls of the preheating section and are staggered as shown in FIGURE 2. Each burner 15, 16 is of the nozzle-mixing type with clear flame combustion supported by air and fuel which must be regulated separately so as to arrive at each burner in stoichiometric rates. Ignition pilots (not shown) are provided in each burner to initiate combustion. Flow of combustion air for the burners 15, 16 is from a blower 27 to an air main 28 having a branch 29, each of which includes an orifice 30 and a control valve AV1, AV2, thence to crossover pipes 32 and headers 33 and finally to burner supply branches 34. Gas is delivered by supply pipe 35 having a branch 36, each of which contains a shutoff valve GV1, GV2, a pressure regulator 37, an orifice 38 and a control valve 39, the gas flowing thence to crossover pipes 40, burner headers 41 and branches 42.

For maintaining a predetermined air/gas ratio to each of the two groups of burners, jet pipe relay control means A and B are provided. Each of these are of known construction and include opposed diaphragms 43a, 43g, which respond to pressure differences across the air and gas orifices 30, 38 so as to position a movable jet pipe 44 which delivers hydraulic fluid to a fluid motor 45 in such manner as to adjust gas valves 39 to bring the pressure differences at orifices 30 and 38 into proper relation. Hydraulic fluid is delivered to the jet pipes 44 from and returned to a pump and reservoir assembly indicated generally at 46. For a more detailed description of a jet pipe relay such as used in control means A and B, reference may be made to U.S. Patent 2,350,808 issued June 6, 1944.

Figure 5:
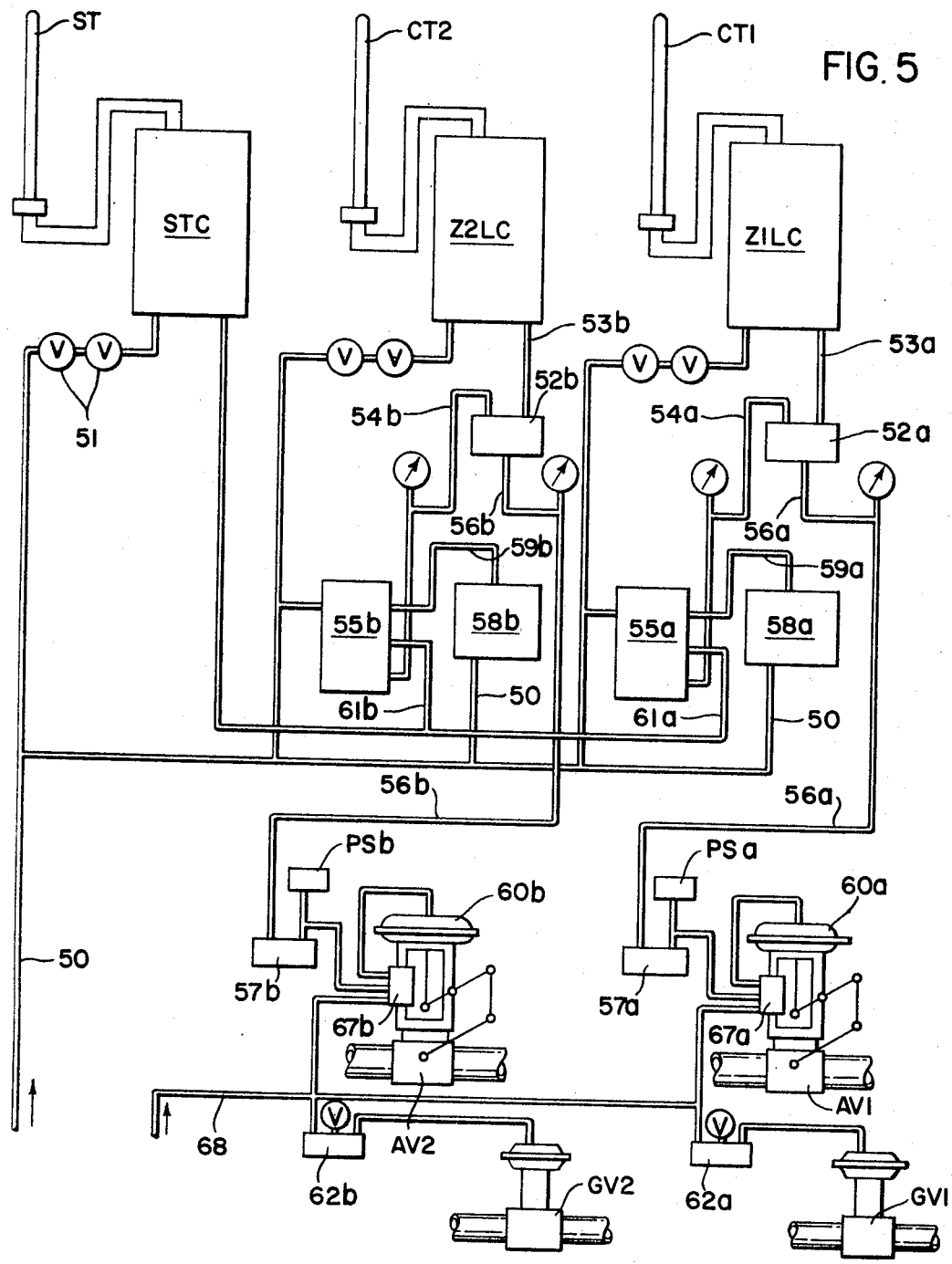
FIGURE 5 is a diagram of a heating control in accordance with the invention.

Referring now to FIGURE 5, in accordance with the preferred embodiment of the invention, a pneumatically operated heating control is shown for regulating the combustion of burners 15, 16 in both zones I and II of the preheating section 12 shown in FIGURE 4. Numerals or capital letters are used to identify devices in connecting lines and lower case letters $a$ and $b$ to distinguish between preheating zones I and II respectively. Thus, identification by zone may be omitted in the following discussion and it will be assumed that a statement applies to both zones. STC designates a control pyrometer connected to a thermocouple ST adapted to be inserted through opening 25 in the bottom wall of vestibule 11 with its junction as close as practicable to the plane of the strip S (FIGURE 2). Alternatively, a radiant heat sensor may be used in place of a thermocouple for which opening 26 is provided in the bottom wall so long as a fairly representative indication is made of actual strip temperature leaving the preheating section. Obviously if the control were to regulate the heating chamber 10, final strip temperature would be measured. Control pyrometers Z1LC and Z2LC are zone temperature limiting controllers for zones I and II respectively. They are connected to zone thermocouples CT1, CT2 which respond to general chamber temperatures at the thermocouple locations in the respective zones. Each of the three control pyrometers STC, Z1LC, Z2LC receive instrument air from line 50 from a source (not shown) through filter and pressure regulator devices 51 normally set to deliver air at the pyrometers at about 18 p.s.i. Pyrometers Z1LC and Z2LC deliver a zone output signal through lines 53a, b, to comparators 52a, b at pressures increasing with the deficiency in temperature readings of the zone thermocouples CT1, CT2 with respect to the zone set point of pyrometers Z1LC, Z2LC. The zone limiting control pyrometers, Z1LC, Z2LC and the pyrometer STC as well, are modulating controllers preferably of the automatic reset type wherein a small or moderate temperature error if it persists will yield a signal at sufficient pressure to affect a burner control device. Comparators 52a, b, receive a computer output signal through lines 54a, b, from computer controllers 55a, b. Their action is to select the signal of lower pressure and to deliver it through lines 56a, b, associated with valve motors 60a, b, controlling AV1, AV2 respectively. 58a, b, are manual loading stations which receive air from line 50 and deliver zone minimum signals at preset pressures to computer controllers 55a, b, through lines 59a, b. In the present case of a two zone preheating section, loading stations 58a, b, are set to deliver zone minimum signals of about 9 and 3 p.s.i. respectively. These pressures are termed zone bias signals because they represent the lowest pressure which must be exceeded by the master signal from pyrometer controller STC through lines 61a, b, in order to initiate action by computer controllers 55a, b. When a master signal in excess of the zone minimum signal is received by a computer controller, for example 55a, the latter outputs a computer output signal to the comparator 52a with such a multiplier that the resultant signal varies approximately from the minimum of 3 p.s.i. to a maximum of about 15 p.s.i. Thus the control device valve motor 60a is operated through its full range (3 to 15 p.s.i.) although the variation of the master signal from control pyrometer STC is from zone minimum pressure to maximum (3 to 9 p.s.i.).

Pneumatic valve motors 60a, b, operating with the valve positioners 67a, b, and relays 57a, b, employ air from motor air supply line 68 to operate valves AV1, AV2 in proportion to the signal received through lines 56a, b. Ordinarily, the useful signal range is between 3 and 15 p.s.i., i.e,. the motor starts to operate the valve at about 3 p.s.i. signal and completes opening at about 15 p.s.i. Positioners 67a, b, are servo controlled devices which employ as much of the air pressure available in line 68 as is needed to produce a valve opening in proportion to the signal from line 56a, b. Relays 57a, b, are associated with positioners 67a, b.

If the master signal from control pyrometer STC via line 61a, b, becomes or remains lower in pressure than the zone minimum signal of loading stations 58a, b, there will be no computer output signal from the computer controller 55a, b, and thus no output signal from comparators 52a, b, for which reason valves 60a, b, close or remain closed as the case may be. The associated burners of the zones in question then become or remain inactive. Air valve positioners 67a, b, are arranged to cause valve motors 60a, b, to close the valves AV1, AV2 completely from a predetermined small opening representing a desirable minimum firing rate from the standpoint of possible back firing or difficulty in maintaining good control of air/gas ratio. It will be appreciated from the discussion with reference to FIGURE 4 that by controlling air valves AV1, AV2, a proportional regulating effect occurs on gas control valves 39 due to the action of the jet pipe relays A, B. In the action of quick-closing or of opening when appropriate, electrically controlled valves 62a, b, (FIGURE 5) each receive an electrical signal from pressure switch PSa or PSb causing gas shutoff valve GV1 or GV2 to act. A bleeder vent of each valve 62a, b, through which the valve opening pressure is released may be equipped with a restriction such as a fixed orifice or a needle valve to delay closing of GV1 or GV2 until the air valve AV1, AV2 has had time to close.

*Operation*

Assuming that the preheating section 12 of the furnace F is in operation at such a production rate that zone II is sufficient to meet the heating requirements, control pyrometer STC whose thermocouple ST is presently satisfied by the strip temperature, will be delivering a master signal of say 8 p.s.i. through lines 61a, b, to each computer controller 55a, b. Assume also that the manual loading station 58a of zone I is set for a zone minimum signal of 9 p.s.i. as stated above; therefore computer controller 55a outputs no computer output signal to comparator 52a and the latter transmits no signal to air valve motor 60a and zone I remains idle.

Consider now zone II. Loading station 58b is set for a zone minimum pressure of only 3 p.s.i. Computer controller 55b, which also receives a signal for 8 p.s.i. from the pyrometer STC delivers a corresponding computer output signal to comparator 52b due to the fact that the zone minimum pressure of loading station 58b is exceeded by the signal from the control pyrometer STC. At the same time, pyrometer Z2LC delivers a zone output to comparator 52b increasing with the difference between the temperature at the thermocouple CT2 and the pyrometer setting. Comparator 52b then compares the output and bias signals, selects the lower of the two and delivers it to the relay 57b and air valve positioner 67b which holds valve motor 60b and consequently air valve AV2 at a corresponding poistion.

With the conditions at thermocouples ST and CT2 at approximately static conditions, the firing of zone II continues at about a constant rate. Unless the chamber temperature at thermocouple CT2 reaches the maximum temperature for which pyrometer Z2LC is set, the firing rate is controlled by strip temperature controller pyrometer STC. If strip temperature rises, the signal output by STC is reduced and firing rate adjusted accordingly.

Consider now that the throughput of the furnace is increased considerably so that zone II, even when its temperature increases to the zone set point of pyrometer Z2LC is not capable alone of delivering strip at the desired temperature. Pyrometer STC will now call for more heat by increasing its output signal via lines 61a, b, to computer controllers 55a, b. When this signal exceeds the zone minimum signal of manual loading station 58a, stated above to be about 9 p.s.i., computer controller 55a delivers a computer output signal through line 54a to comparator 52a. Pyrometer Z1LC being set for a limiting temperature considerably greater than that existing at thermocouple CT1, it will deliver a strong signal to comparator 52a. Upon comparison the latter transmits the lower of the signals from pyrometer Z1LC and from computer controller 55a to air valve motor 60a, causing the valve AV1 to be opened. Since gas valve GV1 also operates along with AV1, zone I is placed in operation automatically. The firing rate of zone I is brought to equilibrium at such input as satisfies strip temperature controller pyrometer STC. Only if the actual maximum capacity of the preheating section is reached does the chamber temperature at thermocouple CT1 reach the limit setting of pyrometer Z1LC. Zone I thus placed in operation automatically will remain in service as long as needed.

If the production rate is reduced, so that both zones are no longer needed, the signal from pyrometer STC becomes lower. When it no longer exceeds the zone minimum signal delivered by loading station 58a to computer controller 55a, the latter ceases the output of a computer output signal to comparator 52a and the latter transmits no output therefore to air valve motor 60a. Air valve AV1 and associated gas valve GV1 will then close and firing of zone I will be discontinued automatically.

It will be appreciated that more than two zones can be controlled in like manner. Obviously, for three zones, the operating range of 3 to 15 p.s.i. of the controlled devices in the present discussion will be divided into thirds. The setting of the manual loading station 58 of the third zone, corresponding to the zone closest to the strip exit, would be set at three pounds, that of the second zone at seven pounds and that of the first zone eleven pounds. The zones now will come into operation as needed, starting with zone III and will cut off in reverse order when not needed. The pneumatic control parts of the above described heating control operate in a known manner and it will be understood that similar parts which are functionally equivalent may be readily substituted without deviating from the overall function of the control.

Figure 6:
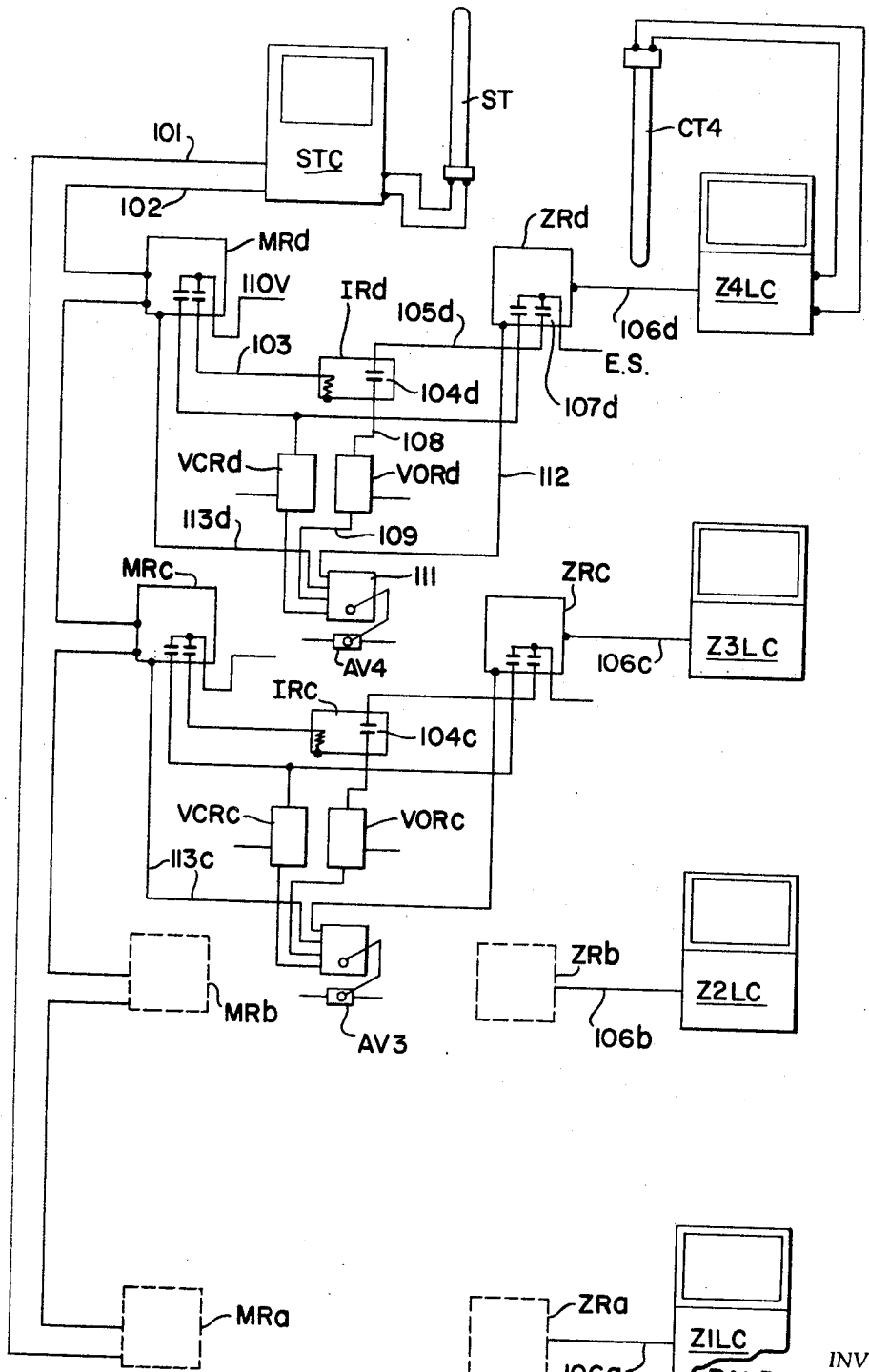
FIGURE 6 is a modification showing an electrically operated heating control for a four zone heating chamber.

Consider now a four zone preheating section having an all-electrical control as shown schematically in FIGURE 6 which is a modification of the invention. As with the pneumatic heating control, the pyrometer controller STC is responsive to strip temperature after traveling through the heating chamber and the zone pyrometer controllers Z1LC through Z4LC are responsive to the ambient temperature in the respective zones. The control groups for two zones are shown, however, it will be understood that identical arrangements are provided for the other zones.

Controller STC delivers a signal through lines 101, 102, which is a variable current depending on total heat demand as evidenced by the strip temperature sensor ST. For purposes of illustration, the signal may be taken as varying between 4 and 20 milliamperes. The current flows through master relays MRa, b, c, d, which are connected in series. Each relay MR is adjusted to respond to a current value in line 102 which is within a preset range. For the illustrative case, the active range of relay MRd may be 4–8 ma.; that of MRc, 8–12 ma.; MRb, 12–16 ma.; and 16–20 ma. for MRa. These ranges result in no overlap, but in general some overlap is acceptable and for certain cases desirable. If the signal in lines 101, 102 is in the range of 4–8 ma., e.g., 6 ma., relay MRd delivers a signal via connection 103 to an isolating relay IRd. This causes the closing of contact 104d through which the pyrometer controller Z4LC now may act to increase the zone temperature unless the latter has reached the zone set point of the controller. Assuming such limit has not been reached, controller Z4LC dispatches a signal via connection 106d to zone relay ZRd, activating contact 107d. This directs power from an external supply E.S. through connection 105d, contact 104d, and connection 108 to valve opening relay VORd and a resultant signal by connection 109 to valve motor 111. Motor 111 opens valve AV4. A feedback signal via line 112 to relay ZRd causes the opening action to terminate in proper relation to the signal via connection 106d from the pyrometer controller Z5LC.

From the foregoing it may be seen that when the master pyrometer controller STC calls for additional heat input, connections are established so that the controller Z4LC may act to cause further opening of AV4, and consequent increase in the temperature of zone IV up to the set point of Z4LC. With increasing heat demand, the signal of master controller STC rises into the active range of master relay MRc. This sets up a circuit through isolating relay IRc through which zone limit controller Z3LC may act to open a corresponding valve AV3 and place zone III in action in accordance with the demand for heat until the entire heating chamber is in operation at maximum capacity.

With decreasing demand, zones I, II and III are cut out in succession automatically. Assuming that zone III is operating on a signal from controller STC near the minimum of the active range of master relay MRc, and the signal is now reduced in response to a decrease in heat demand to a value below the lower limits of the active range, contact 104c will open and the zone limit controller Z3LC wil be unable to actuate valve AV3 in the opening direction. However, relay MRc will act through valve closing relay VCRc to close valve AV3 the proper amount. A feedback signal returns via connections 113c to master relay MRc, limiting the closing action to the proper amount. By means of final closing devices equivalent to those described with respect to the pneumatic control in FIGURE 5, air valve AV3 will be closed completely from a preset minimum and the related gas valve also will close. Zone III is now out of operation.

Thus it may be seen that heat input to a zone is increased if both the master controller STC and the respective zone limit controller Z1LC–Z4LC call for such increase and is reduced if either controller calls for a reduction. Upon reduction to a preset minimum, input to any zone is cut off entirely.

Referring now to the chart in FIGURE 7, the operating features of a control for a four zone heating chamber are depicted for either a pneumatic or an electric control. The total range of the master signal shown by the diagonal line represents the maximum error between the temperature of the thermocouple ST and the temperature setting of pyrometer controller STC and is subdivded into four approximately equal zone ranges according to the respective zone minimum and maximum operating ranges. A dead band exists below the zone minimum temperature of zone IV where the control valves AV1, AV2 are slightly open to facilitate control as previously mentioned. Throughput rate of the strip is represented as increasing from left to right. As the master signal from the control pyrometer STC increases in response to the increase in demand for heat due, for example, to increased throughput, zone IV will come into service and its temperature will increase until the control pyrometer temperature limit setting Z4LC is reached. If the master signal is still increasing, zone III will be brought into service and so on until full capacity is reached. For decreasing demand, the zones are taken out of service in reverse order. Thus, as may be seen from the foregoing, the invention may be employed with various heating elements and regulating means such as direct-fired liquid fuel burners, either premix or nozzle-mix gas burners, resistance heaters or radiant tube heating elements since the control, in accordance with the invention, is directly responsive to strip and zone temperatures rather than to indirect conditions such as fuel line pressure or the like.

Having now described a preferred embodiment of the invention, it will be appreciated by those skilled in the art that various modifications may be made without actually departing from the invention as defined in the appended claims which are intended to cover such modifications except insofar as limited by the prior art.

Having thus described our invention, we claim.

1. A heating control for a succession of heating zones through which strip passes and is heated therein to a uniform exit temperature comprising
    a strip temperature sensor to measure the exit temperature thereof,
    a plurality of zone temperature sensors for measuring the ambient temperature of each heating zone,
    a master controller connected to the strip temperature sensor for generating a master signal which varies over the total heating range of the zones in response to the difference between the exit strip temperature and a strip control temperature,
    a plurality of zone limiting controllers each connected to a zone temperature sensor generating a zone output signal which varies within a predetermined portion of the total heating range in response to the difference in zone temperature and a preset maximum zone temperature, and
    actuating means for continuously and simultaneously comparing the master signal and the respective zone output signals and in response thereto, varying the heating rate by causing successive zones to come into or out of service.

2. A heating control according to claim 1 wherein said actuating means is pneumatically operated and comprises
    a loading station for each zone having a zone bias pressure which is preset to correspond to a minimum pressure which must be exceeded by said master signal before action is initiated to bring that zone into service,
    a computer controller receiving said zone bias pressure and dispatching a computer output pressure if the master signal is larger and
    comparator means receiving said computer output pressure and dispatching a resultant pressure corresponding to said computer output pressure or master signal, whichever is lower, and
    heat regulation means responsive to said resultant pressure for varying the heating rate.

3. A heating control according to claim 1 wherein said actuating means is electrically operated and comprises
    a master relay for each zone connected in series, each adjusted to respond within a preset range to a current value corresponding to said master signal,
    an isolating relay associated with each master relay adapted to receive a signal therefrom when energized by said master signal, a zone relay actuated by said isolating relay and responsive to said zone output signal for controlling an outside power source which may act to increase the zone temperature, and a feedback signal to said zone relay causing the temperature increasing function to terminate in proper relation to said zone output signal.

4. In combination with a furnace having a succession of heating zones through which metal strip passes and is heated therein to a uniform exit temperature, a heating control comprising a strip temperature sensor to measure the exit temperature thereof, a plurality of zone temperature sensors for measuring the ambient temperature of each heating zone, a master controller connected to the strip temperature sensor for generating a master signal which varies over the total heating range of the zones in response to the difference between the exit strip temperature and a strip control temperature, a plurality of zone limiting controllers each connected to a zone temperature sensor generating a zone output signal which varies within a predetermined portion of the total heating range in response to the difference in zone temperature and a preset maximum zone temperature, and actuating means for continuously and simultaneously comparing the master signal and the respective zone output signals and in response thereto, varying the heating rate by causing successive zones to come into or out of service.

5. In combination with a furnace according to claim 4 wherein the heating control is pneumatically operated and comprises a loading station for each zone having a zone bias pressure which is preset to correspond to a minimum pressure which must be exceeded by said master signal before action is initiated to bring that zone into service, a computer controller receiving said zone bias pressure and dispatching a computer output pressure if the master signal is larger than said bias pressure and comparator means receiving said computer output pressure and dispatching a resultant pressure corresponding to said computer output pressure or zone signal, whichever is lower, and heat regulation means responsive to said resultant pressure for varying the heating rate.

6. In combination with a furnace according to claim 4 wherein the heating control is electrically operated and comprises a master relay for each zone connected in series, each adjusted to respond within a preset range to a current value corresponding to said master signal, an isolating relay associated with each master relay adapted to receive a signal therefrom when energized by said master signal, a zone relay actuated by said isolating relay and responsive to said zone output signal for controlling an outside power source which may act to increase the zone temperature, and a feedback signal to said zone relay causing the temperature increasing function to terminate in proper relation to said zone output signal.

7. The method of varying the heating capacity of a continuous strip furnace having a succession of heating zones through which the strip passes for the purpose of being heated to a desired exit temperature, comprising the steps of:

(a) detecting the magnitude of error between the strip's actual exit temperature and said desired exit temperature, (b) generating a first signal increasing with the magnitude of the detected strip temperature error, (c) detecting the magnitude of difference between the ambient temperature in a given zone and a preset temperature for said zone, (d) generating a second signal increasing with the magnitude of said difference detected in step (c), (e) comparing said first and second signals, (f) selecting the signal or lesser magnitude and applying it to adjust the heat input to said given zone to reduce the error between said strip's actual exit temperature and said desired exit temperature, and (g) conducting steps (a) through (f) with respect to each of said succession of heating zones, as required, to essentially eliminate said exit temperature error.

8. In a continuous strip furnace having a succession of heating zones through which the strip passes for the purpose of being heated to a desired exit temperature, a control system for varying the heating capacity of said furnace, comprising (a) means for detecting the magnitude of error between the strip's actual exit temperature and said desired exit temperature, (b) means generating a first signal increasing with the magnitude of the detected strip temperature error, (c) means operative with respect to each of said heating zones for detecting the magnitude of difference between the ambient temperature in each of said zones and a corresponding preset temperature for each of said zones, (d) means operative with respect to each of said zones for generating a second signal increasing with the magnitude of the difference between said ambient and corresponding preset temperature, (e) means operative with respect to each of said zones for comparing said first and second signals, (f) means operative with respect to each of said zones for selecting the signal of lesser magnitude, and (g) means operative with respect to each of said zones for receiving said selected signal, and in response thereto, adjusting the heat input to said zones, as required, thereby to reduce the error between said strip's actual exit temperature and said desired exit temperature.

References Cited

UNITED STATES PATENTS

| | | | |
|---|---|---|---|
| 2,337,410 | 12/1943 | Peters | 263—2 |
| 2,518,905 | 8/1950 | Kniveton | 263—3 |
| 2,518,996 | 8/1950 | Peckham | 236—15 |

ROBERT A. O'LEARY, *Primary Examiner.*

U.S. Cl. X.R.

236—78, 85; 263—3